US012675443B2

(12) United States Patent
Scheinberg

(10) Patent No.: US 12,675,443 B2
(45) Date of Patent: Jul. 7, 2026

(54) SYSTEM AND METHOD FOR PERFORMING CONTEXT AWARE OPERATING FILE SYSTEM VIRTUALIZATION

(71) Applicant: Unity Technologies ApS, Copenhagen (DK)

(72) Inventor: Joseph Franklin Scheinberg, Austin, TX (US)

(73) Assignee: Unity Technologies ApS, Copenhagen (DK)

( * ) Notice: Subject to any disclaimer, the term of this patent is extended or adjusted under 35 U.S.C. 154(b) by 0 days.

(21) Appl. No.: 17/245,930

(22) Filed: Apr. 30, 2021

(65) Prior Publication Data

US 2021/0342308 A1      Nov. 4, 2021

Related U.S. Application Data

(60) Provisional application No. 63/018,296, filed on Apr. 30, 2020.

(51) Int. Cl.
| | |
|---|---|
| *G06F 16/188* | (2019.01) |
| *G06F 16/14* | (2019.01) |
| *G06F 16/16* | (2019.01) |
| *G06F 16/182* | (2019.01) |

(52) U.S. Cl.
CPC .......... *G06F 16/188* (2019.01); *G06F 16/152* (2019.01); *G06F 16/156* (2019.01); *G06F 16/16* (2019.01); *G06F 16/1824* (2019.01)

(58) Field of Classification Search
CPC ...... G06F 16/188; G06F 16/152; G06F 16/16; G06F 16/1824; G06F 16/156
See application file for complete search history.

(56) References Cited

U.S. PATENT DOCUMENTS

| | | | | |
|---|---|---|---|---|
| 7,356,679 | B1 * | 4/2008 | Le | G06F 16/116 |
| | | | | 713/1 |
| 9,852,150 | B2 * | 12/2017 | Sharpe | G06F 3/0611 |
| 10,474,588 | B1 * | 11/2019 | Ugale | G06F 12/128 |
| 10,503,897 | B1 * | 12/2019 | Striem-Amit | G06F 21/552 |
| 10,901,715 | B1 * | 1/2021 | Raiman | G06F 9/4552 |
| 11,070,609 | B1 * | 7/2021 | Kumar | H04L 67/06 |
| 11,494,338 | B2 * | 11/2022 | Hasegawa | G06F 16/13 |
| 2002/0049760 | A1 * | 4/2002 | Scott | H04L 67/104 |
| 2004/0221294 | A1 * | 11/2004 | Kalmuk | G06F 9/544 |
| | | | | 719/312 |
| 2005/0091655 | A1 * | 4/2005 | Probert | G06F 21/6218 |
| | | | | 718/100 |
| 2005/0131900 | A1 * | 6/2005 | Palliyll | G06F 16/9014 |

(Continued)

*Primary Examiner* — Vaishali Shah

(74) *Attorney, Agent, or Firm* — Schwegman Lundberg & Woessner, P.A.

(57) ABSTRACT

A method of accessing content in a virtualized file system is disclosed. A virtualization API is called to enumerate a list of files within a target directory. The calling of the virtualization API includes bypassing a calling of an operating system API included on a device. The enumeration includes reading from a local data structure on the device. A content data item within a file of the enumerated list of files is determined to be required for an application to perform an operation. A content identifier is determined for the content data item. The content identifier is stored in the local data structure for subsequent access to the content data item.

16 Claims, 8 Drawing Sheets

(56)                References Cited

U.S. PATENT DOCUMENTS

| | | | | |
|---|---|---|---|---|
| 2007/0136501 A1* | 6/2007 | Chang | G06F 13/4291 | 711/115 |
| 2007/0226704 A1* | 9/2007 | Nichols | G06F 21/56 | 717/131 |
| 2009/0024817 A1* | 1/2009 | Oved | G06F 13/28 | 711/170 |
| 2010/0154056 A1* | 6/2010 | Smith | G06F 21/562 | 726/22 |
| 2013/0166580 A1* | 6/2013 | Maharajh | G06Q 30/0244 | 707/758 |
| 2013/0227201 A1* | 8/2013 | Talagala | G06F 13/28 | 711/103 |
| 2014/0094121 A1* | 4/2014 | Ben-Shalom | H04L 63/18 | 455/41.2 |
| 2014/0325643 A1* | 10/2014 | Bart | H04L 63/1425 | 726/22 |
| 2014/0334471 A1* | 11/2014 | Chen | H04W 12/088 | 370/338 |
| 2015/0127661 A1* | 5/2015 | Zamir | G06F 16/178 | 707/748 |
| 2015/0262386 A1* | 9/2015 | Nataros | H04N 21/8153 | 345/583 |
| 2016/0154819 A1* | 6/2016 | Thomas | G06F 3/04842 | 707/626 |
| 2017/0124345 A1* | 5/2017 | Christiansen | G06F 16/1727 | |
| 2018/0060350 A1* | 3/2018 | Christiansen | G06F 16/188 | |
| 2018/0129821 A1* | 5/2018 | Havewala | G06F 3/0664 | |
| 2018/0150528 A1* | 5/2018 | Shah | G06F 16/254 | |
| 2018/0329905 A1* | 11/2018 | Christiansen | G06F 16/164 | |
| 2018/0357246 A1* | 12/2018 | Strogov | G06N 5/025 | |
| 2020/0341827 A1* | 10/2020 | Morard | G06F 9/547 | |

* cited by examiner

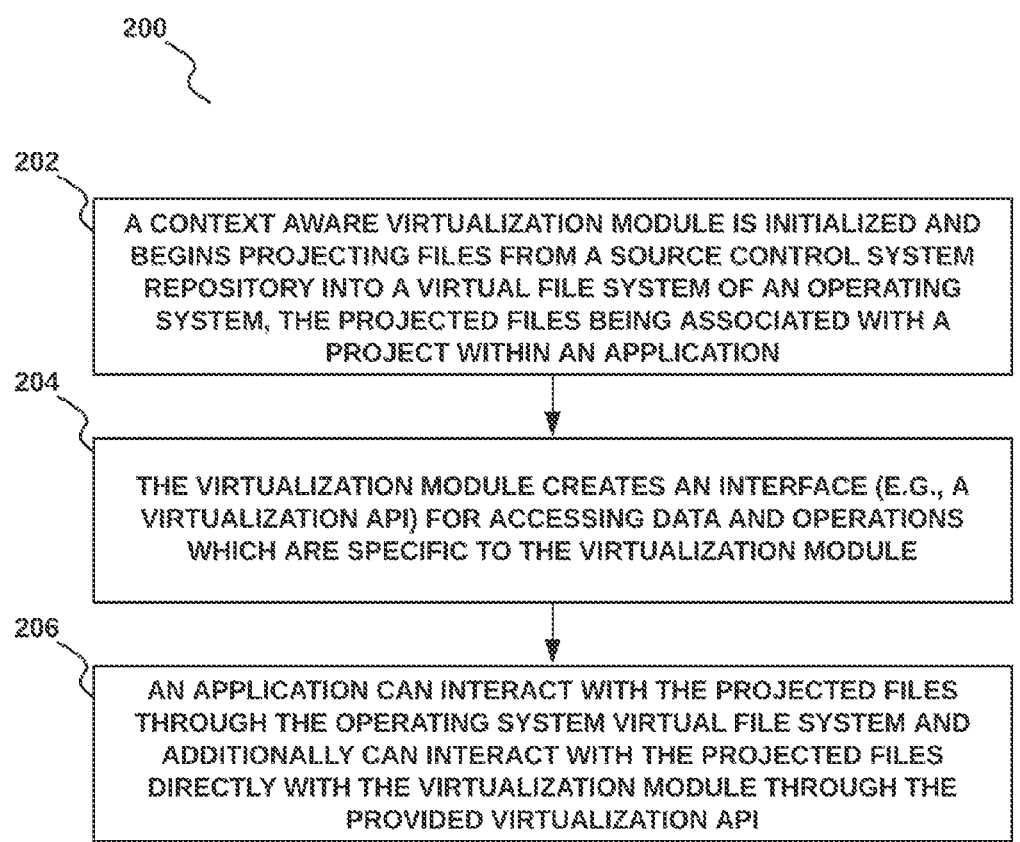

200

202
A CONTEXT AWARE VIRTUALIZATION MODULE IS INITIALIZED AND BEGINS PROJECTING FILES FROM A SOURCE CONTROL SYSTEM REPOSITORY INTO A VIRTUAL FILE SYSTEM OF AN OPERATING SYSTEM, THE PROJECTED FILES BEING ASSOCIATED WITH A PROJECT WITHIN AN APPLICATION

204
THE VIRTUALIZATION MODULE CREATES AN INTERFACE (E.G., A VIRTUALIZATION API) FOR ACCESSING DATA AND OPERATIONS WHICH ARE SPECIFIC TO THE VIRTUALIZATION MODULE

206
AN APPLICATION CAN INTERACT WITH THE PROJECTED FILES THROUGH THE OPERATING SYSTEM VIRTUAL FILE SYSTEM AND ADDITIONALLY CAN INTERACT WITH THE PROJECTED FILES DIRECTLY WITH THE VIRTUALIZATION MODULE THROUGH THE PROVIDED VIRTUALIZATION API

Fig. 2

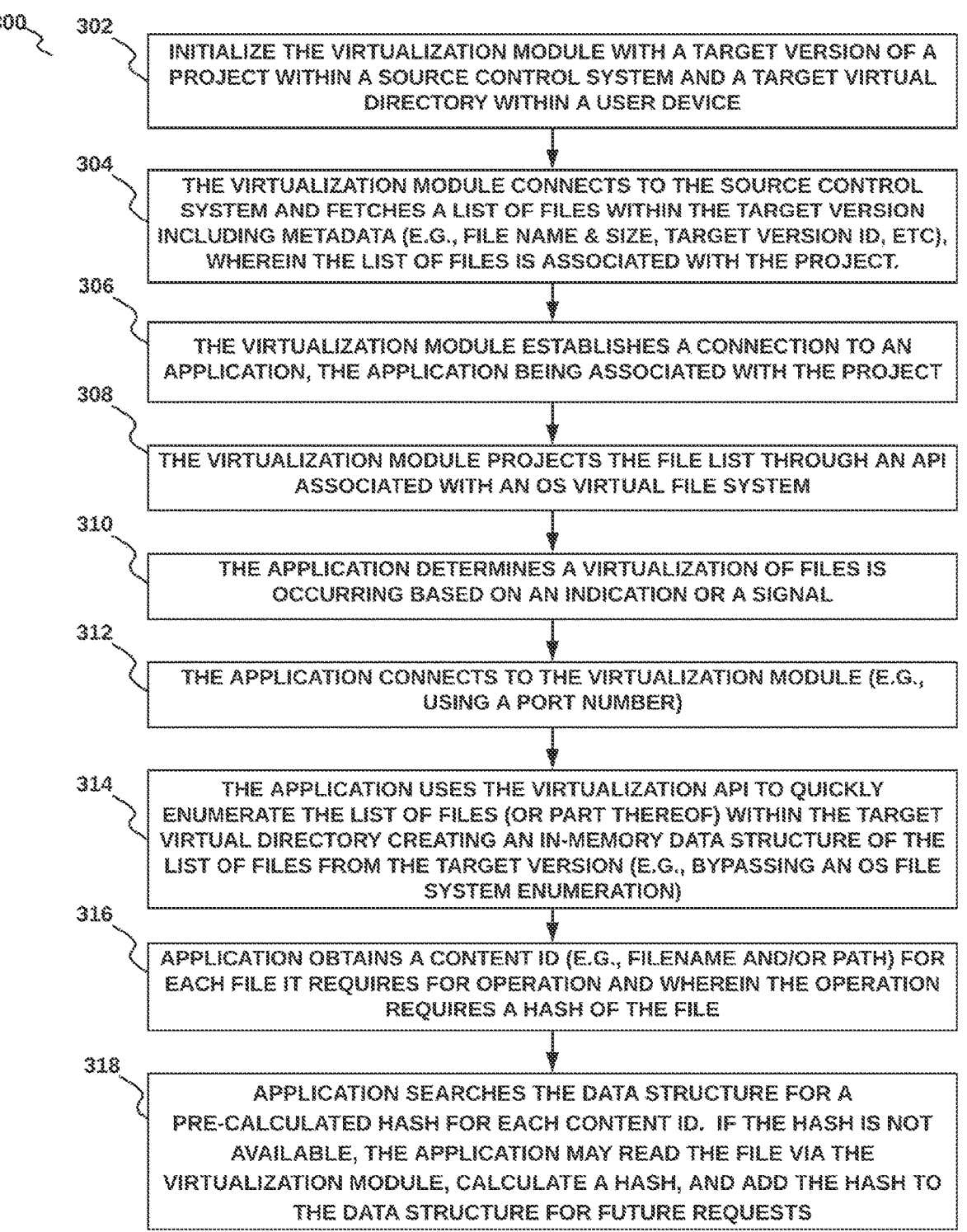

300

302 INITIALIZE THE VIRTUALIZATION MODULE WITH A TARGET VERSION OF A PROJECT WITHIN A SOURCE CONTROL SYSTEM AND A TARGET VIRTUAL DIRECTORY WITHIN A USER DEVICE

304 THE VIRTUALIZATION MODULE CONNECTS TO THE SOURCE CONTROL SYSTEM AND FETCHES A LIST OF FILES WITHIN THE TARGET VERSION INCLUDING METADATA (E.G., FILE NAME & SIZE, TARGET VERSION ID, ETC), WHEREIN THE LIST OF FILES IS ASSOCIATED WITH THE PROJECT.

306 THE VIRTUALIZATION MODULE ESTABLISHES A CONNECTION TO AN APPLICATION, THE APPLICATION BEING ASSOCIATED WITH THE PROJECT

308 THE VIRTUALIZATION MODULE PROJECTS THE FILE LIST THROUGH AN API ASSOCIATED WITH AN OS VIRTUAL FILE SYSTEM

310 THE APPLICATION DETERMINES A VIRTUALIZATION OF FILES IS OCCURRING BASED ON AN INDICATION OR A SIGNAL

312 THE APPLICATION CONNECTS TO THE VIRTUALIZATION MODULE (E.G., USING A PORT NUMBER)

314 THE APPLICATION USES THE VIRTUALIZATION API TO QUICKLY ENUMERATE THE LIST OF FILES (OR PART THEREOF) WITHIN THE TARGET VIRTUAL DIRECTORY CREATING AN IN-MEMORY DATA STRUCTURE OF THE LIST OF FILES FROM THE TARGET VERSION (E.G., BYPASSING AN OS FILE SYSTEM ENUMERATION)

316 APPLICATION OBTAINS A CONTENT ID (E.G., FILENAME AND/OR PATH) FOR EACH FILE IT REQUIRES FOR OPERATION AND WHEREIN THE OPERATION REQUIRES A HASH OF THE FILE

318 APPLICATION SEARCHES THE DATA STRUCTURE FOR A PRE-CALCULATED HASH FOR EACH CONTENT ID. IF THE HASH IS NOT AVAILABLE, THE APPLICATION MAY READ THE FILE VIA THE VIRTUALIZATION MODULE, CALCULATE A HASH, AND ADD THE HASH TO THE DATA STRUCTURE FOR FUTURE REQUESTS

Fig. 3

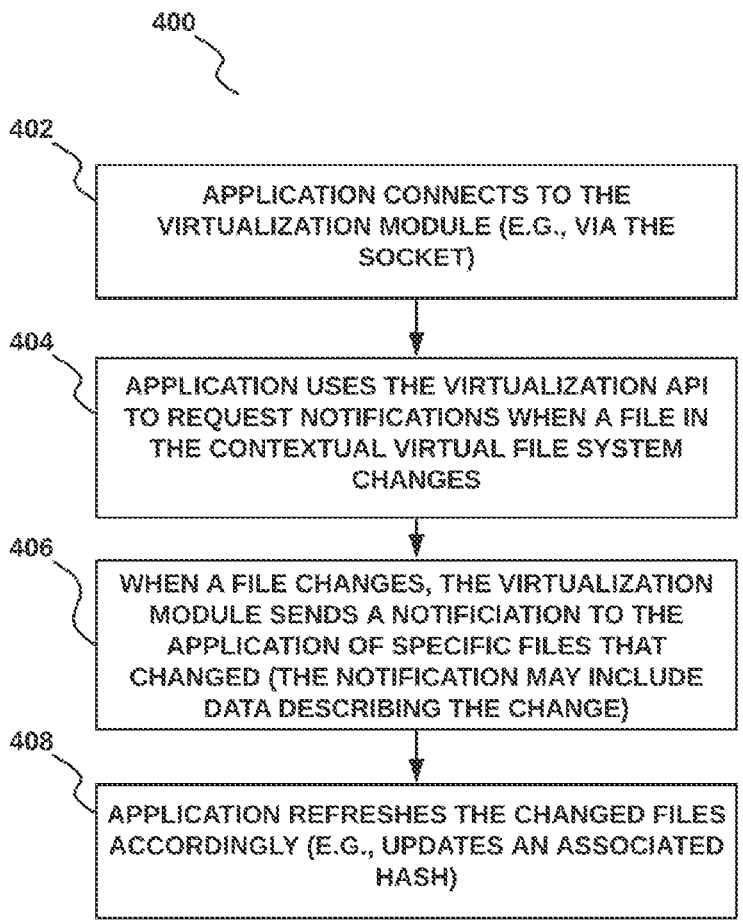

400

402

APPLICATION CONNECTS TO THE
VIRTUALIZATION MODULE (E.G., VIA THE
SOCKET)

404

APPLICATION USES THE VIRTUALIZATION API
TO REQUEST NOTIFICATIONS WHEN A FILE IN
THE CONTEXTUAL VIRTUAL FILE SYSTEM
CHANGES

406

WHEN A FILE CHANGES, THE VIRTUALIZATION
MODULE SENDS A NOTIFICIATION TO THE
APPLICATION OF SPECIFIC FILES THAT
CHANGED (THE NOTIFICATION MAY INCLUDE
DATA DESCRIBING THE CHANGE)

408

APPLICATION REFRESHES THE CHANGED FILES
ACCORDINGLY (E.G., UPDATES AN ASSOCIATED
HASH)

Fig. 4

SYSTEM AND METHOD FOR PERFORMING CONTEXT AWARE OPERATING FILE SYSTEM VIRTUALIZATION

CROSS-REFERENCE TO RELATED APPLICATIONS

This application claims the benefit of U.S. Provisional Application No. 63/018,296, filed Apr. 30, 2020, entitled "SYSTEM AND METHOD FOR PERFORMING CONTEXT AWARE OPERATING FILE SYSTEM VIRTUALIZATION," which is incorporated by reference herein in its entirety.

TECHNICAL FIELD

The subject matter disclosed herein generally relates to the technical field of operating systems for computer systems, and in one specific example, to methods and systems for performing virtualization of a computer file system.

BACKGROUND OF THE INVENTION

Current large digital content creation projects, such as movies and large video games, that include large source workspaces have scalability issues related to the extreme size of their workspaces. One such issue is that storage requirements for an entire source workspace can often exceed hard drive storage capacity. Another issue is that syncing to a specific version of the entire source workspace can be very time consuming.

Some creators solve these issues by storing different types of files in different source repositories and manually syncing only a subset of files to a working memory when the files are required. For example, a creator might have a first dedicated repository for large graphics files, and a second repository for exported texture files. This approach requires a large amount of manual source control setup. Additionally, these solutions are problematic because they cause the source data to be distributed in a sub-optimal way. Furthermore, a developer might not know the exact files they need in advance.

BRIEF DESCRIPTION OF THE DRAWINGS

Further features and advantages of example embodiments of the present invention will become apparent from the following detailed description, taken in combination with the appended drawings, in which:

FIG. 2 is a flowchart illustrating a method for context aware file virtualization using a context aware file virtualization system, in accordance with one embodiment;

FIG. 3 is a flowchart illustrating a method for context aware file virtualization using a context aware file virtualization system, in accordance with one embodiment;

FIG. 4 is a flowchart illustrating a method for monitoring virtualized files using a context aware file virtualization system, in accordance with one embodiment;

It will, be noted that throughout the appended drawings, like features are identified by like reference numerals.

DETAILED DESCRIPTION

Figure 1A:
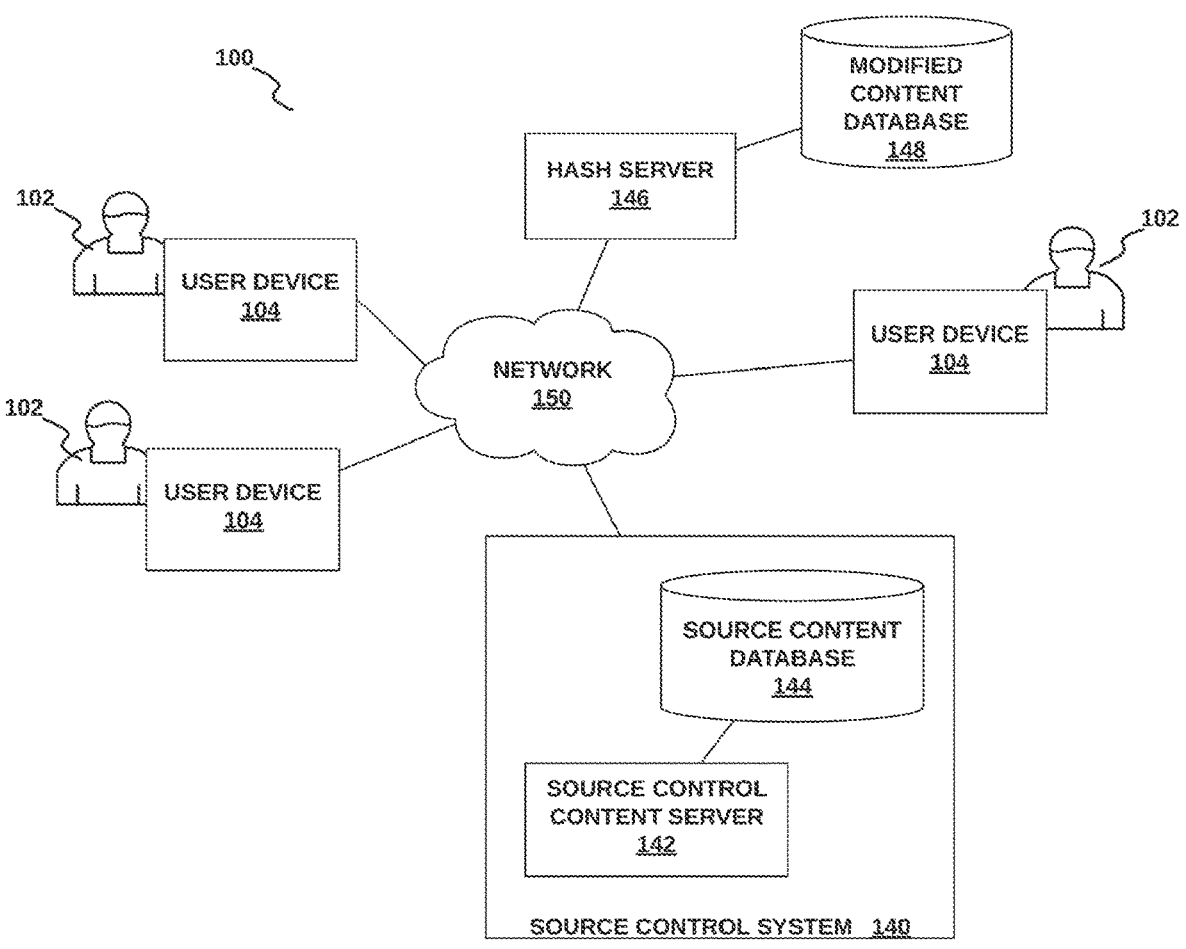
FIG. 1A is a schematic illustrating a context aware file virtualization system, in accordance with one embodiment.

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that various embodiments of the inventive subject matter may be practiced without these specific details.

The term 'game' used throughout the description herein should be understood to include video games and applications that execute and present, video games on a device, and applications that execute and present simulations on a device. The term 'game' should also be understood to include programming code (either source code or executable binary code) which is used to create and execute the game on a device.

The term 'environment' used throughout the description herein should be understood to include 2D digital environments (e.g., 2D video game environments, 2D simulation environments, 2D content creation environments, and the like), 3D digital environments (e.g., 3D game environments, 3D simulation environments, 3D content creation environment, virtual reality environments, and the like), and augmented reality environments that include both a digital (e.g., virtual) component and a real-world component.

The term 'game object', used throughout the description herein is understood to include any object of digital nature, digital structure or digital element within an environment. A game object can represent (e.g., in a corresponding data structure) almost anything within the environment; including 3D models (e.g., characters, weapons, scene elements (e.g., buildings, trees, cars, treasures, and the like)) with 3D model textures, backgrounds (e.g., terrain, sky, and the like), lights, cameras, effects (e.g., sound and visual), animation, and more. The term 'game object' may also be understood to include linked groups of individual game objects. A game object is associated with data that defines properties and behavior for the object.

The terms 'asset', 'game asset', and 'digital asset', used throughout the description herein are understood to include any data that can be used to describe a game object or can be used to describe an aspect of a digital project (e.g., including: a game, a film, a software application). For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more game objects within a game at runtime (e.g., during execution of the game).

The term 'build' and 'game build' used throughout the description herein should be understood to include a compiled binary code of a game which can be executed on a device, and which, when executed can provide a playable version of the game (e.g., playable by a human or by an artificial intelligence agent).

The terms 'client' and 'application client' used throughout the description herein are understood to include a software client or software application that can access data and services on a server, including accessing over a network.

A method of accessing content in a virtualized file system is disclosed. A virtualization API is called to enumerate a list of files within a target directory. The calling of the virtualization API includes bypassing a calling of an operating system API included on a device. The enumeration includes reading from a local data structure on the device. A content data item within a file of the enumerated list of files is determined to be required for an application to perform an operation. A content identifier is determined for the content data item. The content identifier is stored in the local data structure for subsequent access to the content data item.

The present invention includes apparatuses which perform one or more operations or one or more combinations of operations described herein, including data processing systems which perform these methods and computer readable media which when executed on data processing systems cause the systems to perform these methods, the operations or combinations of operations including non-routine or unconventional operations or combinations of operations.

Turning now to the drawings, systems and methods, including non-routine or unconventional components or operations, or combinations of such components or operations, for context aware file operating system virtualization in accordance with embodiments of the invention are illustrated. In accordance with an embodiment, the methods and systems described herein provided efficient operation of a computer application in a virtualized file system environment on a device wherein file metadata is visible and interactive, and without file system source files being present on the device. In accordance with an embodiment, the systems and methods described herein configure a computer application to take advantage of a context aware virtualization module 124 of a virtualized file system to improve an operating efficiency of the application, by for example allowing the application to perform efficient file enumeration on opening (e.g., as described with respect to operation 314) and efficient management or hash files (e.g., as described with respect to operation 316 and 318).

In accordance with an embodiment, there is described herein a context aware file virtualization system and associated methods for creating a context aware virtual file system that an application can communicate with (e.g., via an application interface API) to take advantage of the context of the virtualization. The described systems and methods allow the application to operate on a large source repository without having to download the entire source repository to a local device, and whereby the context provides the application with information from the source repository which is not available via an operating system virtual file systems. A problem with an operating system (OS) virtual file system is that it limits an application interacting with the OS to information associated with the OS file system. This is desirable in some situations, as some applications may be built on an OS file system with no interest in how the file system is hosted. The context aware virtual file system described herein informs the application that it is working with a virtualized file system and provides a method by which it can take advantage of the virtualization to operate more efficiently with repository data.

In accordance with an embodiment, FIG. 1A is a diagram of an example context aware file virtualization system 100 and associated devices configured to provide context aware file virtualization functionality. In accordance with an embodiment, the context aware file virtualization system 100 includes one or more user devices 104, a content control system 140 coupled in networked communication via a network 150 (e.g., a cellular network, a Wi-Fi network, the Internet, and so forth). In some embodiments, the user device 104 is a computing device such as a desktop computer, smartphone or a tablet computer. In some embodiments the user device may be operated by a human user 102. In other embodiments, the user device 104 is a head-mounted display (HMD) device worn by a user, such as an augmented reality (AR) or virtual reality (VR) visor (e.g., Google Glass®, HTC Vive®, Microsoft HoloLens®, and so forth). In some embodiments the content control system 140 may include a source control content server 142 and a content database 144. In some embodiments there are a plurality of user devices 104, while in other embodiments there is only one user device 104.

In accordance with some embodiments, the context aware file virtualization system 100 may include a hash server 146 and a modified content database 148. The hash server 146 and the modified content database 148 may be used to store modified data (e.g., including hashes) associated with files from the source control system 140 as described with respect to operations (e.g., operations 316 and 318) within the method 300 described in reference to FIG. 3 and as described with respect to operation 408 described within the method 400 described in reference to FIG. 4.

Figure 1B:
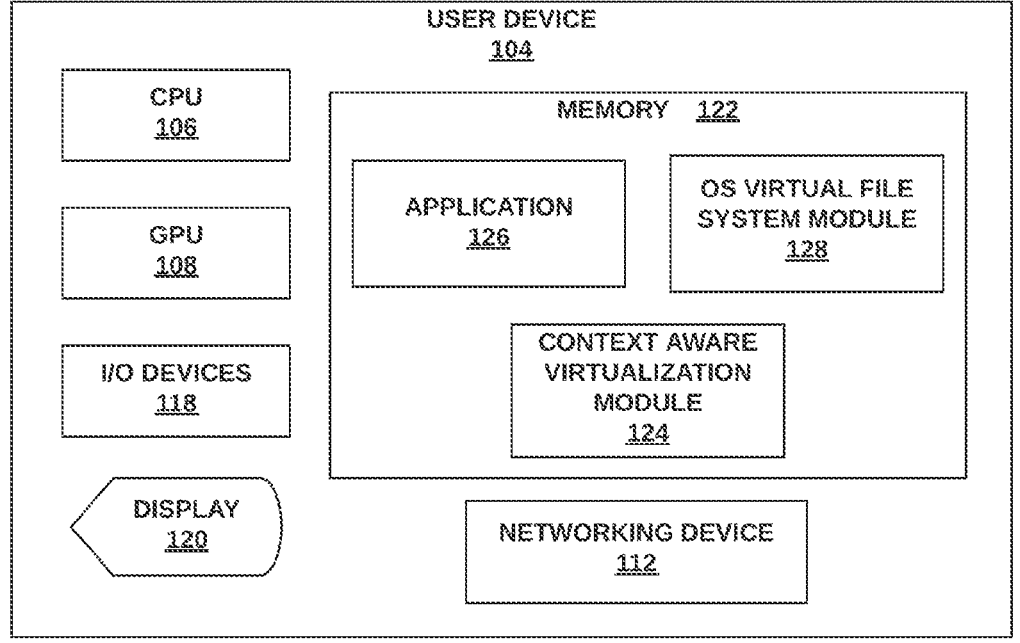
FIG. 1B is a schematic illustrating details of a user device within a context aware file virtualization system, in accordance with one embodiment.

In accordance with an embodiment, and shown in FIG. 1B, is a schematic diagram of a user device 104. The user device 104 may include one or more central processing units (CPUs) 106, and graphics processing units (GPUs) 108. The CPU processing device 106 is any type of processor, processor assembly comprising multiple processing elements (not shown), having access to a memory 122 to retrieve instructions stored thereon, and execute such instructions. Upon execution of such instructions, the instructions implement the processing device 106 to perform a series of tasks as described herein with reference to FIG. 2, FIG. 3, and FIG. 4. The user device 104 also includes one or more networking devices 112 (e.g., wired or wireless network adapters) for communicating across the network 150.

In accordance with an embodiment, the user device 104 also includes one or more input devices 118 such as, for example, a keyboard or keypad, mouse, pointing device, touchscreen, a microphone, a camera or hand-held device (e.g., hand motion tracking device) for inputting information in the form of a data signal readable by the processing device 106. The user device 104 further includes one or more display devices 120, such as a computer screen, touchscreen of a tablet or smartphone, or lenses or visor of a VR or AR HMD, which may be configured to display digital objects.

In accordance with an embodiment, the memory 122 can be any type of memory device, such as random access memory, read only or rewritable memory, internal processor caches, and the like. The memory 122 may be configured to store a client context aware file virtualization module ("client module" or "context aware virtualization module") 124 that may be executed by the CPU 106 or GPU 108 to perform operations as described herein with respect to FIG. 2, FIG. 3, and FIG. 4. The memory 122 may also be configured to store an operating system file virtualization module ("OS virtual file system module" or "OS virtual file system") 128 that may be executed by the CPU 106 or GPU 108 to perform operations as described herein with respect to FIG. 2, FIG. 3, and FIG. 4. The memory may also store an application module 126 (e.g., executed by the CPU 106 or GPU 108) that communicates with the display device 112 and also with other hardware such as the input/output device(s) 118 to present an application to the user 102. In accordance with an embodiment, the application 126 may provide an environment (e.g., including user interfaces) and tools for content creation (e.g., creation of video games, digital films, simulation environments, and the like). The application 126 may include a game engine that provides a digital environment (e.g., a video game environment) to the user 102. The game engine would typically include one or more modules that provide the following: simulation of a virtual environment and game objects therein (e.g., including animation of game objects, animation physics for game objects, collision detection for game objects, and the like), rendering of the virtual environment and the game objects therein, networking, sound, and the like in order to provide the user with a complete or partial virtual environment (e.g., including video game environment or simulation environment) via the display device 120. In accordance with an embodiment, the simulation and rendering of the virtual environment may be decoupled, each being performed independently and concurrently, such that the rendering step may use a recent state of the virtual environment and current settings of the virtual scene to generate a visual representation at an interactive frame rate and, independently thereof, the simulation step updates the state of at least some of the digital objects (e.g., at another rate).

In accordance with an embodiment, though not shown in FIG. 1A or FIG. 1B, the source control content server device 142 may include a memory storing a server context aware file virtualization module ("server module") 134. During operation, the client context aware file virtualization module 124 and the server context aware file virtualization module 134 perform the various context aware file virtualization functionalities described herein. In some example embodiments, some functionality may be implemented within the client module 124 and other functionality may be implemented within the server module 134. In some example embodiments, the source control system 140 is an external system that is plugged into the client module 124 (e.g., via one or more application program interfaces or APIs).

Figure 1C:
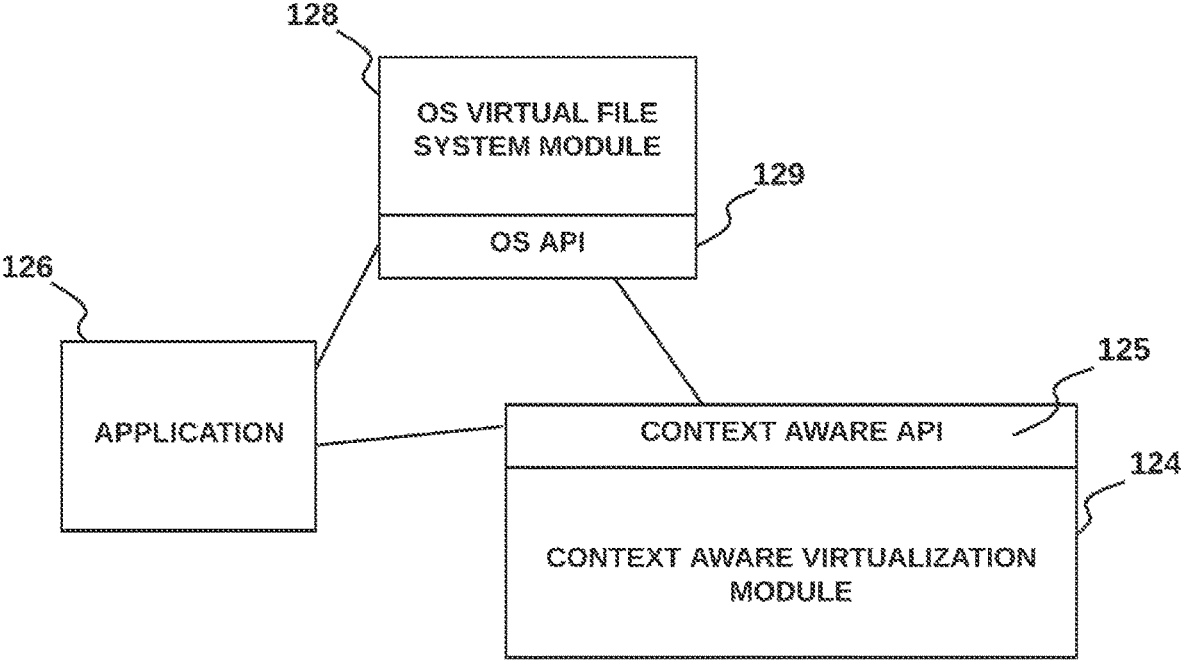
FIG. 1C is a data flow graph showing communication between an application, an operating system virtualization module, and a context aware virtualization module, in accordance with one embodiment.

In accordance with an embodiment, and shown in FIG. 1C is a data flow diagram showing communication between the application 126, the OS virtual file system module 128, and the context aware virtualization module 124. The application 126 may communicate with the OS virtual file system module 128 via an OS API 129, and the application 126 may communicate with the context aware virtualization module 124 via a virtualization API 125. In addition, the OS virtual file system module 128 may communicate with the context aware virtualization module 124 with their respective APIs. While not shown in FIG. 1C, the application may also communicate with an API.

In accordance with an embodiment, and shown in FIG. 2 is a flowchart showing a method 200 for context aware file virtualization. The method 200 may be used in conjunction with the context aware file virtualization system 100 as described with respect to FIG. 1A, FIG. 1B, and FIG. 1C. In various embodiments, some of the method elements shown may be performed concurrently, in a different order than shown, or may be omitted. At operation 202 of the method 200, a context aware virtualization module 124 is initialized and begins projecting files from a source control system 140 repository (e.g., a source content database 144) into a file system of a computer operating system (OS), wherein the files are associated with a project within an application 126 (e.g., wherein the project is associated with digital content creation including video games, films, simulations, and the like). The initialization may include the context aware virtualization module 124 accessing data describing one or more of the following: a link to a target version of the project (e.g., identification number, label, http link, or the like) within the source control system 140, a target virtual directory (e.g., directory name, file path, and the like), and communication credentials for the source control system 140 (e.g., session authentication) to enable communication between the context aware virtualization module 124 and the source control system 140. In accordance with an embodiment, the accessing of the data may include receiving data from the application 126, and/or receiving data from a user via a user interface (e.g., on an I/O device 118 on the user device 104). In accordance with an embodiment, the target version within the source control system 140 includes a plurality of data (e.g., data files, folders, and the like) associated with the project. In accordance with an embodiment, the computer OS operates on the user device 104.

In accordance with an embodiment, at operation 204 of the method 200, the context aware virtualization module 124 creates an interface whereby the application 126 can access and perform operations on data via the context aware virtualization module 124, wherein the operations and data may be specific to the virtualization (e.g., operations and data associated with the target version which is in addition to operations and data which can be accessed from an OS virtual file system module 128). The created interface may be an application interface (API); for example, the created interface may be the virtualization API 125 (e.g., as shown in FIG. 1C). In accordance with an embodiment, the context aware virtualization module 124 may additionally provide a graphical user interface on the display device 120, wherein the graphical user interface may be used to display information associated with operations throughout the methods 300 and 400 described below with respect to FIG. 3 and FIG. 4 respectively. In addition, the graphical user interface may be used to receive information (e.g., from the user 102) during operations throughout the methods 300 and 400; for example, as described below in association with operation 302, the virtualization module 124 may receive initialization data from the user via the graphical user interface.

In accordance with an embodiment, at operation 206 of the method 200, the application 126 accesses files through an operating system file system API 129 (OS API as shown in FIG. 1C) and additionally communicates directly with the context aware virtualization module 124 through the provided virtualization API 125 to modify content within the files from the repository and perform additional operations (e.g., which an OS API cannot perform) as described in operations 314, 316, and 318 of the method 300 described with respect to FIG. 3.

In accordance with an embodiment, and shown in FIG. 3 is a flowchart showing a method 300 for context aware file virtualization. The method 300 includes initiating a connection between an application 126 on a user device 104 and a source control system 140 using a context aware file virtualization system 100. The method 300 may be used in conjunction with the context aware file virtualization system 100 as described with respect to FIG. 1A, FIG. 1B, and FIG. 1C. In various embodiments, some of the method elements shown may be performed concurrently, in a different order than shown, or may be omitted. In accordance with an embodiment, at operation 302 of the method 300, the context aware virtualization module 124 is initialized, wherein the initialization includes accessing data describing a target version within the source control system 140 (e.g., a version specifier, version identifier or the like), and a target virtual directory within an operating system of the user device 104, wherein the application 126 may be executing. The accessing of the data may include receiving the data from a user (e.g., receiving a description of the target version and target virtual directory via a user interface) and/or may include receiving data from the application 126. In accordance with some embodiments, the initialization data may include credentials to connect with and communicate with the source control system 140 (e.g., session authentication).

In accordance with an embodiment, at operation 304 of the method 300, the context aware virtualization module 124 connects (e.g., using the credentials) to the source control system 140 and fetches a list of files within the provided target version. The list may include metadata such as file names, file sizes, a target version number (or other identifier), and more. In accordance with an embodiment, as part of operation 304, data for the list is placed within a memory. In some embodiments, the memory is a quick access cache memory. In some embodiments the memory is a local memory (e.g., a memory 122 on the user device 104 associated with the virtualization module 124), and in other embodiments the memory is a remote memory (e.g., a memory on the hash server 146).

In accordance with an embodiment, at operation 306 of the method 300, the context aware virtualization module 124 establishes a connection with the application 126. In accordance with an embodiment, the establishing of a connection includes listening for communication from the application 126 (e.g., listening via one or more socket connections). For example, the communication from the application 126 may be a predetermined communication indicating a readiness of the application 126 (e.g., that the application is starting to execute or wants to initiate communication with the virtualization module 124). In accordance with an embodiment, based on the context aware virtualization module 124 receiving a communication via a socket of the one or more sockets, the context aware virtualization module 124 may record (e.g., within a text file and/or a memory) a port identifier for the socket. In accordance with an embodiment, as part of operation 306, the application 126 connects to the context aware virtualization module 124, wherein the connection may be via the recorded socket connection. In accordance with an embodiment, the context aware virtualization module 124 exposes an API (e.g., the virtualization API 125) over the connection to allow the application 126 to virtualize efficiently using further operations within the method 300.

In accordance with an embodiment, at operation 308 of the method 300, the context aware virtualization module 124 projects the file list (e.g., the file list from operation 304) through the operating system virtual file system 128. The projecting may include sending the file list and associated metadata to the operating system virtual file system 128 to make the files virtual (e.g., to appear and behave as files stored on the user device 104 even though contents of the files are not stored on the user device 104). For example, this may be achieved using one or more functions of the OS virtual file system 128. In example embodiments, the context aware virtualization module 124 may perform this projecting or virtualization by calling one or more of the OS APIs 129 of the user device 104, such as one or more APIs for opening, reading, writing, or closing a file. In example embodiments, the one or more OS APIs 129 may be selected based on the one or more APIs being supported by a plurality of different operating systems, making the projecting or virtualization independent of any particular platform of the user device 104.

In accordance with an embodiment, at operation 310 of the method 300, during operation of the application 126, the application 126 may determine that one or more files within the list of files is virtualized based on an indication from the context aware virtualization module 124. For example, the application 126 may receive (e.g., via communication with the context aware virtualization module 124) an indication that the target version is virtualized (e.g., that files from the list of files are virtualized with the context aware virtualization module 124). Alternatively, at operation 310 of the method 300, during an operation of the application 126, the application 126 may search for an indication that the target version is virtualized. The indication may be in different forms; for example there may be a notification (e.g., or signal) received by the application 126 from the context aware virtualization module 124 or there may be a notification (e.g., signal) created by the context aware virtualization module 124 that is found (e.g., searched for and discovered) by the application 126. The notification or signal may be a file that contains data which signals the virtualization. The signal or the notification may include data describing a method of communication (e.g., a file that includes a port number for communication).

In accordance with an embodiment, at operation 312 of the method 300, the application 126 connects to the context aware virtualization module 124. The application 126 may connect using data within the notification or the signal, which may include credentials or data for establishing the connection (e.g., such as a communication port number).

In accordance with an embodiment, at operation 314 of the method 300, the application 126 uses the virtualization API 125 provided by the context aware virtualization module 124 to quickly enumerate the list of files (or a part thereof) within a memory (e.g., in a local device cache memory 122 or within a remote cache memory such as on the hash server 146). In accordance with an embodiment, the enumeration may include receiving the list of files and associated metadata (e.g., as stored in a cache memory during operation 304) from the context aware virtualization module 124. The receiving (e.g., including a transferring of data from the context aware virtualization module 124 and the application 126) may be faster than traditional enumeration techniques based on the list of files and the associated metadata being stored in a cache memory. For example, the context aware virtualization module 124 may have a data structure that includes the list of files and associated metadata in memory (e.g., cache memory as described in operation 304), and thereby can provide the required information very quickly. The enumeration by the context aware virtualization module 124 may create a data structure (e.g., a database) within the cache memory of the user device 104, wherein the data structure includes a plurality of files from the project folder. In accordance with an embodiment, the enumeration is performed without using the OS virtualization module 128 (e.g., bypassing an enumeration from the OS file virtualization system 128). In accordance with an embodiment, the bypassing is done to avoid problems which may occur with OS virtual file systems 128, based on the OS virtual file system 128 introducing inefficient overhead in some situations. For example, an OS virtual file system 128 may perform enumeration by creating a placeholder file for each file being enumerated and thereby could perform many hard memory disk file read and write operations, which can be a very slow process based on project folder having a large number of files.

In accordance with an embodiment, at operation 316 of the method 300, the application 126 determines a requirement for data within a file of the list of files and furthermore determines an associated content identifier (content ID) for the required data. For example, the required data (within the required file) may be required for an operation (e.g., a mathematical operation within an animation function) within the application 126. In accordance with an embodiment, the operation may in addition require a hash value for the required file (e.g., in order to determine any changes in the required file). In accordance with an embodiment, the application 126 may determine that each file within the list of files is a required file and may also determine at least one content ID for each of the files. In accordance with an embodiment, the content ID for the required data may include a filename (e.g., and a file path) for the required file which contains the required data. The content ID may be an identifier for specific content data within the required file based on the file containing one or more groupings of content. For example, the required file may contain separate groupings of texture data with each grouping associated with a digital object or a part of a digital object, and with a unique content ID linking to each separate grouping.

In accordance with an embodiment, as part of operation 316 and 318, the application 126 may require that data from the required file be in a target data format (e.g., a native data format associated with the application 126) which may be different from an initial data format of the file (e.g., a data format of the file within the target version in the source control system 140). For example, consider that the application 126 receives (e.g., from the source control system 140) a texture file in a PNG format but whereby the application 126 requires texture data in a proprietary format for rendering a 3D digital object on a display. Based on the target data format being different from the initial data format, the application 126 may convert the data from the initial data format to the target data format. In accordance with an embodiment, and as part of operation 318, the context aware virtualization module may calculate a hash for a format converted file such that the hash value may be used to identify the file with the target data format.

In accordance with an embodiment, at operation 318 of the method 300, based on the application 126 requiring a hash for a required file, the application 126 searches a memory for a pre-caiculated hash associated with the required file. In accordance with an embodiment, and as part of operation 318, the application 126 searches the cache memory used in operation 314 (e.g., within the data structure created in operation 314). The searched memory cache may be on the user device 104 (e.g., a local memory cache) or it may be on a server (e.g., the hash server 146) and accessed via the network 150. In accordance with an embodiment, based on a pre-calculated hash being found in the local cache memory 122, the application 126 can use the hash immediately. In accordance with an embodiment, based on a pre-calculated hash being found in the remote cache memory (e.g., in the hash server 146), the application 126 may first download (e.g., over the network 150) the pre-calculated hash to the user device 104 prior to use. Based on the memory being a memory cache (e.g., and due to data structure created in operation 314), the search time and subsequent retrieval time of the required hash data is faster than accessing similar data in a conventional OS virtualization system 128.

In accordance with an embodiment, as part of operation 318, based on a pre-calculated hash not being available in the searched memory (e.g., not being found in the data structure created in operation 314), the application 126 may read the original source file from the source control system 140 (e.g., via the OS virtual file system module 128), convert data in the file if necessary (e.g., a formatting conversion), calculate a hash of the file, and send the calculated hash to the memory cache (e.g., to be saved within the data structure created in operation 314) for future requests for the file. The calculated hash may be sent to the local cache memory 122, a remote cache memory on the hash server 146, or to both the local memory and the remote memory.

In accordance with an embodiment, based on a first opening of a project within the application 126, a memory cache (e.g., the local memory cache 122 and/or the remote memory cache in the hash server 146) may be populated with hashes for all files within the project by performing the following: downloading ail files associated with the project from the source control system 140 (e.g., via the OS virtual file system module 128), converting files as necessary (e.g., due to formatting issues), calculating hashes for all the files, and loading the hashes into the memory cache (e.g., via the context aware virtualization module 124 within the data structure created in operation 314 and modified in operation 318). In accordance with another embodiment, based on a first opening of a project within the application 126, there is provided a service within the context aware virtualization module 124 that downloads files associated with the project over time from the target version in the source control system 140, calculates hashes for the files, and loads the hashes into the memory cache (e.g., via the context aware virtualization module 124 within the data structure created in operation 314 and modified in operation 318) on the fly as files are needed.

In accordance with an embodiment, a context aware file virtualization system 100 may include a plurality of user devices 104 (e.g., as shown in FIG. 1A), wherein each user device 104 runs a client version of an application 126 along with a context aware virtualization module 124, and wherein each client version of the application 126 is working with a same project in the source control system 140 (e.g., with a same target version in operation 302). Based on hashes (e.g., hashes referred to in operation 316 and 318) for the same project being saved in the remote cache memory on the hash server 146 (e.g., within the data structure created in operation 314 and modified in operation 318), the hashes for the same project can be shared between the plurality of user devices 104 (e.g., via the client modules 124), wherein each client module 124 can load hashes to or fetch hashes from the hash server 146, as needed. Accordingly, instead of each client module 124 on each user device 104 of the plurality of user devices 104 downloading, possibly converting (e.g., a format), and hashing each file within the project folder, a client module of the plurality of client modules 124 will first check the shared memory cache (e.g., in operation 318) on the hash server 146 for a desired hash file and which may have been previously created by another client module 124 (e.g., within the data structure created in operation 314 and modified in operation 318). In this way, a first client version of the application 126 may benefit from a hash file created by a second client version of the application 126.

In accordance with an embodiment, and shown in FIG. 4, is a method 400 for monitoring and updating virtualized files using the context aware file virtualization system 100. The method 400 may be used in conjunction with the context aware file virtualization system 100 as described with respect to FIG. 1A, FIG. 1B, and FIG. 1C. In various embodiments, some of the method elements shown may be performed concurrently, in a different order than shown, or may be omitted. The monitoring may be done to detect a change in one or more files that are virtualized by the context aware virtualization module 124. The change may include an updating of content within the one or more files in the source control system 140. A change may also include modifications to metadata associated with the file as may occur when a file is modified by a second application or a process within the operating system (e.g., via an OS virtual file system module 128). In accordance with an embodiment, and according to the method 400, during operation (e.g., during execution of the method 200 described in FIG. 2 or the method 300 described in FIG. 3), the application 126 may perform the following additional operations for monitoring one or more files virtualized by the context aware virtualization module 124. In accordance with an embodiment, at operation 402 of the method 400, the application 126 connects to the context aware virtualization module 124. The connection may be via a connection created during operation 306 of the method 300 (e.g., via the socket). In accordance with an embodiment, at operation 404, the application 126 may request that the context aware virtualization module 124 send a notification when a change is detected. In accordance with an embodiment, as part of operation 406 of the method 400, based on detecting a change, the context aware virtualization module 124 may send a notification to the application 126 that includes data describing a set of files that have changed, including a description of changes for each file. In accordance with an embodiment, at operation 408 of the method 400, the application 126 updates the set of files accordingly, the updating including calculating a new hash for a changed file and sending the new hash for the file to the cache memory (e.g., the local memory cache 122 and/or the remote memory cache in the hash server 146) to replace an existing hash for the changed file (e.g., within the data structure created in operation 314 and modified in operation 318).

In accordance with an embodiment, the virtualization API 125 from the context aware virtualization module 124 can include a plurality of functions which may be called by an application 126 (e.g., during the method 200, the method 300, and the method 400 described in FIG. 2, FIG. 3, and FIG. 4 respectively). A first function might be to retrieve a content identifier (e.g., a unique file hash identifier) when provided with a file path (e.g., including a file name). For example, the first function might be used within operation 316 of the method 300. A second function might be to perform enumeration, the enumeration function providing a list of directories and files within a directory path when provided with data describing a directory path and enumeration options. For example, the second function might be used within operation 314 of the method 300. A third function might be a 'watch' or 'monitoring' function as described above with respect to the method 400 described with respect to FIG. 4, whereby the function notifies the application 126 when a file is modified within a provided path (e.g., a virtualized file).

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 5:
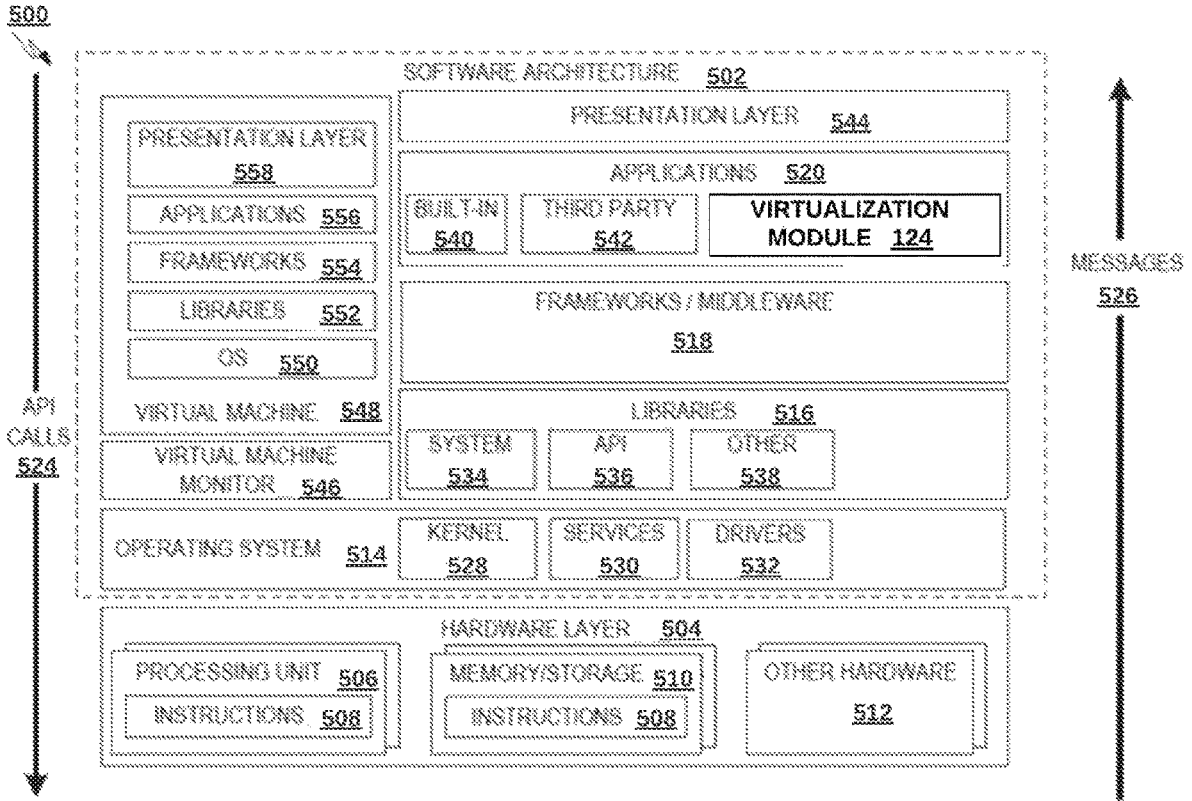
FIG. 5 is a block diagram illustrating an example software architecture, which may be used in conjunction with various hardware architectures described herein.

FIG. 5 is a block diagram 500 illustrating an example software architecture 502, which may be used in conjunction with various hardware architectures herein described to provide a gaming engine 501 and/or components of the context aware file virtualization system 100. FIG. 5 is a non-limiting example of a software architecture and it will be appreciated that many other architectures may be implemented to facilitate the functionality described herein. The software architecture 502 may execute on hardware such as a machine 600 of FIG. 6 that includes, among other things, processors 610, memory 630, and input/output (I/O) components 650. A representative hardware layer 504 is illustrated and can represent, for example, the machine 600 of FIG. 6. The representative hardware layer 504 includes a processing unit 506 having associated executable instructions 503. The executable instructions 503 represent the executable instructions of the software architecture 502, including implementation of the methods, modules and so forth described herein. The hardware layer 504 also includes memory/storage 510, which also includes the executable instructions 508. The hardware layer 504 may also comprise other hardware 512.

In the example architecture of FIG. 5, the software architecture 502 may be conceptualized as a stack of layers where each layer provides particular functionality. For example, the software architecture 502 may include layers such as an operating system 514, libraries 516, frameworks or middleware 518, applications 520 and a presentation layer 544. Operationally, the applications 520 and/or other components within the layers may invoke application programming interface (API) calls 524 through the software stack and receive a response as messages 526. The layers illustrated are representative in nature and not ail software architectures have all layers. For example, some mobile or special purpose operating systems may not provide the frameworks/middleware 518, while others may provide such a layer. Other software architectures may include additional or different layers.

The operating system 514 may manage hardware resources and provide common services. The operating system 514 may include, for example, a kernel 528, services 530, and drivers 532. The kernel 528 may act as an abstraction layer between the hardware and the other software layers. For example, the kernel 528 may be responsible for memory management, processor management (e.g., scheduling), component management, networking, security settings, and so on. The services 530 may provide other common services for the other software layers. The drivers 532 may be responsible for controlling or interfacing with the underlying hardware. For instance, the drivers 532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 516 may provide a common infrastructure that may be used by the applications 520 and/or other components and/or layers. The libraries 516 typically provide functionality that allows other software modules to perform tasks in an easier fashion than to interface directly with the underlying operating system 514 functionality (e.g., kernel 528, services 530 and/or drivers 532). The libraries 616 may include system libraries 534 (e.g., C standard library) that may provide functions such as memory allocation functions, string manipulation functions, mathematic functions, and the like. In addition, the libraries 516 may include API libraries 536 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 516 may also include a wide variety of other libraries 538 to provide many other APIs to the applications 520 and other software components/modules.

The frameworks 518 (also sometimes referred to as middleware) provide a higher-level common infrastructure that may be used by the applications 520 and/or other software components/modules. For example, the frameworks/middleware 518 may provide various graphic user interface (GUI) functions, high-level resource management, high-level location services, and so forth. The frameworks/middleware 518 may provide a broad spectrum of other APIs that may be utilized by the applications 520 and/or other software components/modules, some of which may be specific to a particular operating system or platform.

The applications 520 include built-in applications 540 and/or third-party applications 542. Examples of representative built-in applications 540 may include, but are not limited to, a contacts application, a browser application, a book reader application, a location application, a media application, a messaging application, and/or a game application. Third-party applications 542 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 542 may invoke the API calls 524 provided by the mobile operating system such as operating system 514 to facilitate functionality described herein.

The applications 520 may use built-in operating system functions (e.g., kernel 528, services 530 and/or drivers 532), libraries 516, or frameworks/middleware 518 to create user interfaces to interact with users of the system. Alternatively, or additionally, in some systems, interactions with a user may occur through a presentation layer, such as the presentation layer 544. In these systems, the application/module "logic" can be separated from the aspects of the application/module that interact with a user.

Some software architectures use virtual machines. In the example of FIG. 5, this is illustrated by a virtual machine 548. The virtual machine 548 creates a software environment where applications/modules can execute as if they were executing on a hardware machine (such as the machine 600 of FIG. 6, for example). The virtual machine 548 is hosted by a host operating system (e.g., operating system 514) and typically, although not always, has a virtual machine monitor 546, which manages the operation of the virtual machine 548 as well as the interface with the host operating system (i.e., operating system 514). A software architecture executes within the virtual machine 548 such as an operating system (OS) 550, libraries 552, frameworks 554, applications 556, and/or a presentation layer 558. These layers of software architecture executing within the virtual machine 548 can be the same as corresponding layers previously described or may be different.

Figure 6:
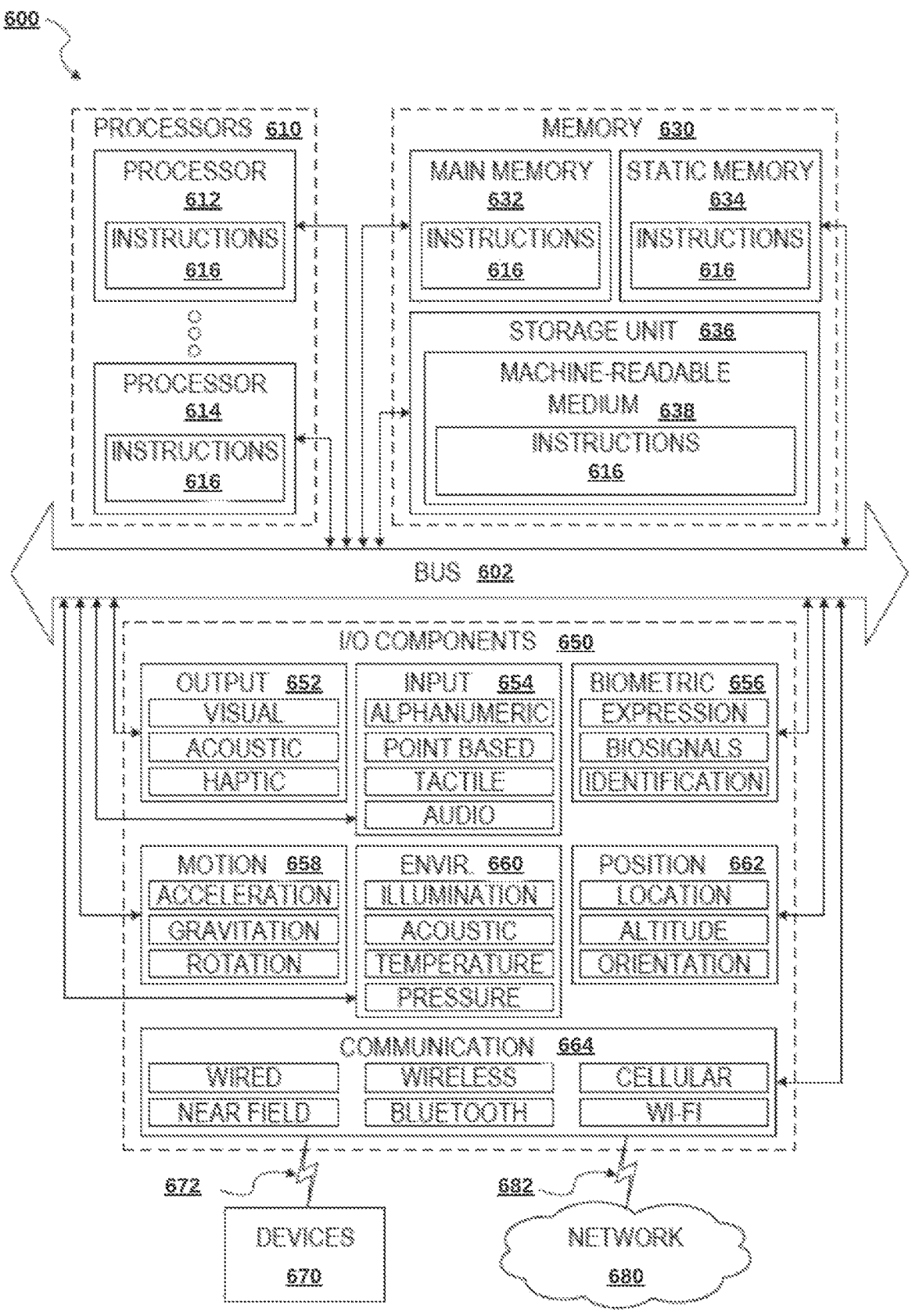
FIG. 6 is a block diagram illustrating components of a machine, according to some example embodiments, configured to read instructions from a machine-readable medium (e.g., a machine-readable storage medium) and perforin any one or more of the methodologies discussed herein.

FIG. 6 is a block diagram illustrating components of a machine 600, according to some example embodiments, configured to read instructions from a machine-readable medium (e.g., a machine-readable storage medium) and perform any one or more of the methodologies discussed herein. In some embodiments, the machine 600 is similar to the user device 104. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. As such, the instructions 616 may be used to implement modules or components described herein. The instructions transform the general, non-programmed machine into a particular machine programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines that individually or jointly execute the instructions 616 to perform any one or more of the methodologies discussed herein.

The machine 600 may include processors 610, memory 630, and input/output (I/O) components 650, which may be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 612 and a processor 614 that may execute the instructions 616. The term "processor" is intended to include multi-core processor that may comprise two or more independent processors (sometimes referred to as "cores") that may execute instructions contemporaneously. Although FIG. 6 shows multiple processors, the machine 600 may include a single processor with a single core, a single processor with multiple cores (e.g., a multi-core processor), multiple processors with a single core, multiple processors with multiples cores, or any combination thereof.

The memory/storage 630 may include a memory, such as a main memory 632, a static memory 634, or other memory, and a storage unit 636, both accessible to the processors 610 such as via the bus 602. The storage unit 636 and memory 632, 634 store the instructions 616 embodying any one or more of the methodologies or functions described herein. The instructions 616 may also reside, completely or partially, within the memory 632, 634, within the storage unit 636, within at least one of the processors 610 (e.g., within the processor's cache memory), or any suitable combination thereof, during execution thereof by the machine 600. Accordingly, the memory 632, 634, the storage unit 636, and the memory of processors 610 are examples of machine-readable media 638.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine 600 (e.g., processors 610), cause the machine 600 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 650 may include a wide variety of components to receive input, provide output, produce output, transmit information, exchange information, capture measurements, and so on. The specific input/output (I/O) components 650 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 650 may include many other components that are not shown in FIG. 6. The input/output (I/O) components 650 are grouped according to functionality merely for simplifying the following discussion and the grouping is in no way limiting. In various example embodiments, the input/output (I/O) components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like.

The motion components 653 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 650 may include communication components 664 operable to couple the machine 600 to a network 680 or devices 670 via a coupling 682 and a coupling 672 respectively. For example, the communication components 664 may include a network interface component or other suitable device to interface with the network 680. In further examples, the communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a Universal Serial Bus (USB)).

Moreover, the communication components 664 may detect identifiers or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 662, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

What is claimed is:

1. A system comprising:
one or more computer processors;
one or more computer memories;
a set of instructions incorporated into the one or more computer memories, the set of instructions causing the one or more computer processors to perform operations, the operations comprising:
based on a number of files in a list of files within a target directory on a client device, calling a virtualization application programming interface (API) to enumerate the list of files within the target directory on the client device, the enumerating of the list of files including bypassing an operating system virtual file system module on the client device, the calling of the virtualization API including creating a data structure in a memory that includes the list of files, the bypassing of the operating system virtual file system module comprising avoiding an enumeration of the list of files by the operating system virtual file system module, the memory including one or more of a local cache memory on the client device or a remote cache memory on a hash server;
determining that, to perform an operation, an application on the client device requires data within a file of the enumerated list of files and determining a content identifier for the data; and
when a hash for the file is found in the data structure, using the hash substantially immediately and, when the hash for the file is not found in the data structure, reading the file via the operating system virtual file system module, converting the file from an initial data format to a target data format, calculating the hash for the file, and storing the hash and the content identifier in the data structure in the memory for speeding up subsequent access to the data, wherein the hash identifies the converted file.

2. The system of claim 1, the operations further comprising, based on a determination that the application requires the hash for the file, searching data structure for the hash during the subsequent access.

3. The system of claim 2, the operations further comprising, based on the hash being found in the remote cache memory, downloading the hash and storing the hash in the local cache memory for a further subsequent use.

4. The system of claim 1, the operations further comprising receiving a projection of the list of files through an operating system API.

5. The system of claim 1, wherein the application is associated with a target version of a project within a source control system in which files of the list of files are stored.

6. The system of claim 1, wherein the determining of the content identifier is based on a one or more groupings of the data.

7. The system of claim 6, wherein each of the one or more groupings corresponds to a separate grouping of texture data associated with a digital object or a part of a digital object.

8. The system of claim 1, wherein the operation is included in an animation function within the application and the content identifier identifies a grouping of texture data within the file.

9. The system of claim 1, the operations further comprising converting the file from an initial format to a target format based on a requirement of the application and wherein the hash is calculated for the converted file.

10. The system of claim 1, wherein the operating system virtual file system module is configured to create a placeholder for each file in the list of files.

11. The system of claim 1, wherein the target data format is a native data format associated with the application.

12. A non-transitory computer-readable storage medium storing a set of instructions that, when executed by one or more computer processors, causes the one or more computer processors to perform operations, the operations comprising:
based on a number of files in a list of files within a target directory on a client device, calling a virtualization application programming interface (API) to enumerate the list of files within the target directory on the client device, the enumerating of the list of files including bypassing an operating system virtual file system module on the client device, the calling of the virtualization API including creating a data structure in a memory that includes the list of files, the bypassing of the operating system virtual file system module comprising avoiding an enumeration of the list of files by the operating system virtual file system module, the memory including one or more of a local cache memory on the client device or a remote cache memory on a hash server;
determining that, to perform an operation, an application on the client device requires data within a file of the enumerated list of files and determining a content identifier for the data; and
when a hash for the file is found in the data structure, using the hash substantially immediately and, when the hash for the file is not found in the data structure, reading the file via the operating system virtual file system module, converting the file from an initial data format to a target data format, calculating the hash for the file, and storing the hash and the content identifier in the data structure in the memory for speeding up subsequent access to the data, wherein the hash identifies the converted file.

13. The non-transitory computer-readable storage medium of claim 12, the operations further comprising, based on a determination that the application requires the hash for the file, searching the data structure for the hash during the subsequent access.

14. The non-transitory computer-readable storage medium of claim 13, the operations further comprising, based on the hash being found in the remote cache memory, downloading the hash and storing the hash in the local cache memory for a further subsequent use.

15. The non-transitory computer-readable storage medium of claim 12, the operations further comprising receiving a projection of the list of files through an operating system API.

16. A method comprising:

based on a number of files in a list of files within a target directory on a client device, calling a virtualization application programming interface (API) to enumerate the list of files within the target directory on the client device, the enumerating of the list of files including bypassing an operating system virtual file system module on the client device, the calling of the virtualization API including creating a data structure in a memory that includes the list of files, the bypassing of the operating system virtual file system module comprising avoiding an enumeration of the list of files by the operating system virtual file system module, the memory including one or more of a local cache memory on the client device or a remote cache memory on a hash server;

determining that, to perform an operation, an application on the client device requires data within a file of the enumerated list of files and determining a content identifier for the data; and when a hash for the file is found in the data structure, using the hash substantially immediately and, when the hash for the file is not found in the data structure, reading the file via the operating system virtual file system module, converting the file from an initial data format to a target data format, calculating the hash for the file, and storing the hash and the content identifier in the data structure in the memory for speeding up subsequent access to the data, wherein the hash identifies the converted file.

\* \* \* \* \*